(No Model.) 2 Sheets—Sheet 1.
W. HOPPER & I. J. ALLEN.
CORN PLANTER.
No. 294,623. Patented Mar. 4, 1884.
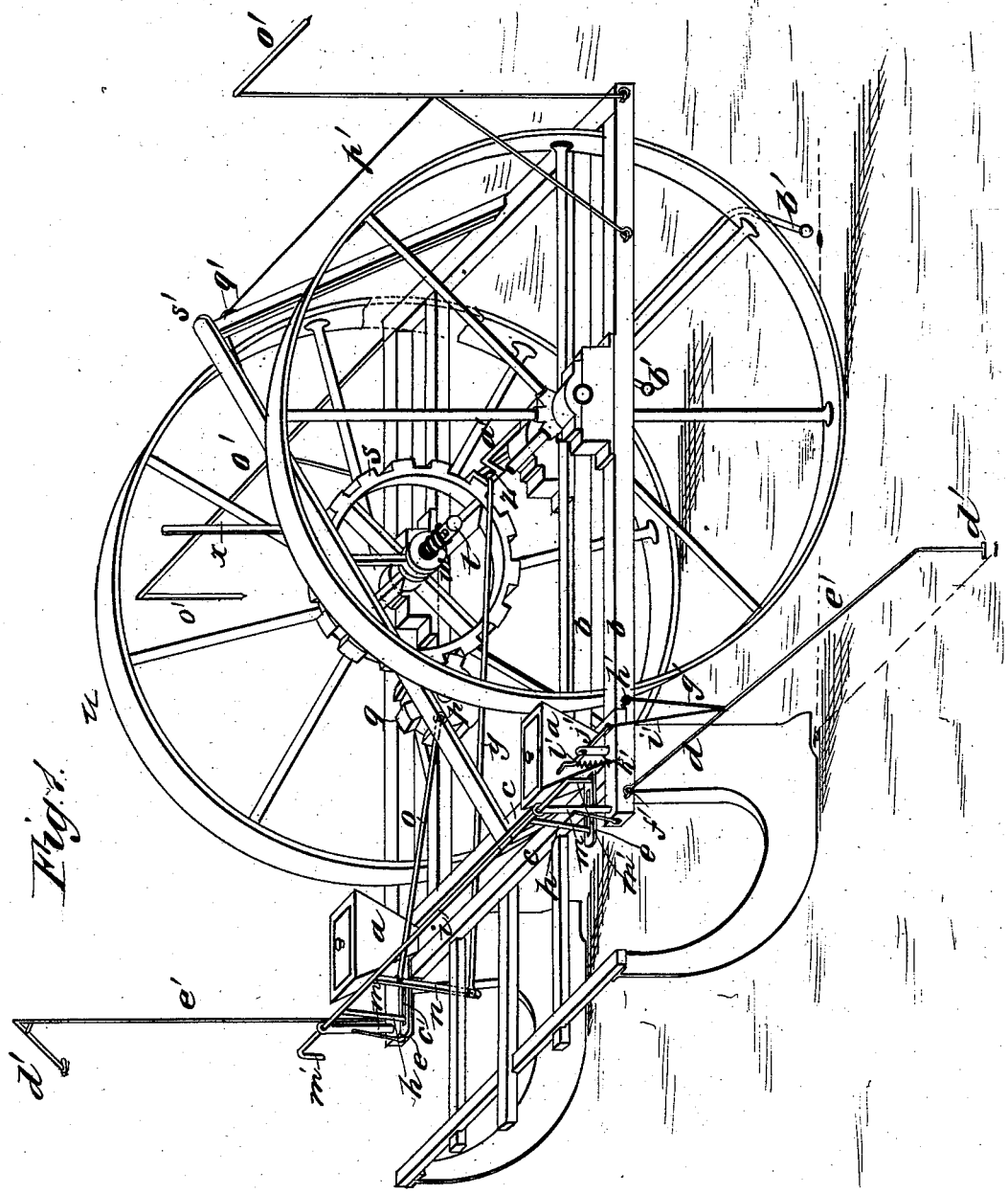
WITNESSES:
Francis McArdle.
C. Sedgwick
INVENTOR:
W. Hopper
I. J. Allen
BY Munn & Co
ATTORNEYS.

(No Model.) 2 Sheets—Sheet 2.
W. HOPPER & I. J. ALLEN.
CORN PLANTER.
No. 294,623. Patented Mar. 4, 1884.
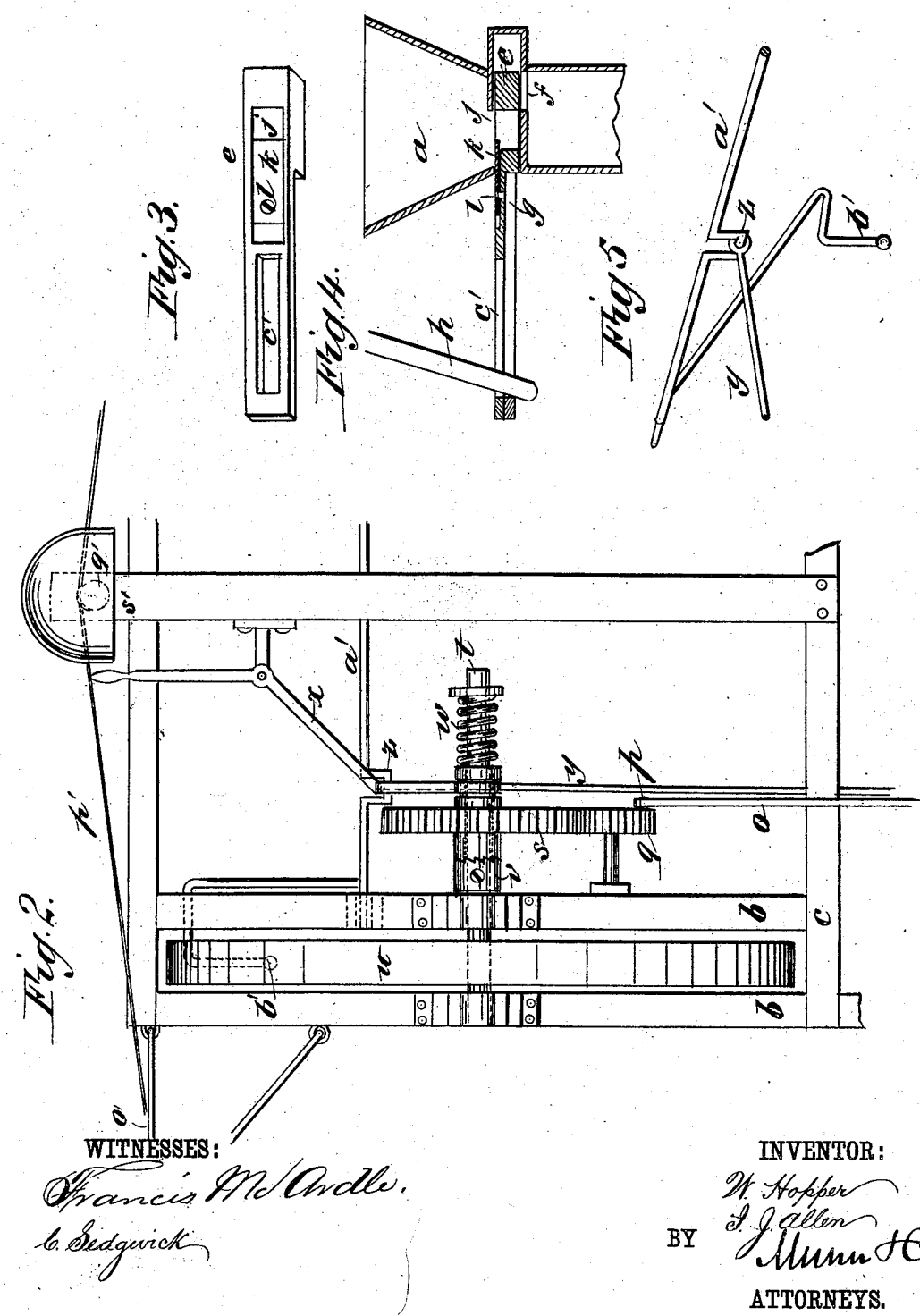
WITNESSES:
Francis McArdle
C. Sedgwick
INVENTOR:
W. Hopper
I. J. Allen
BY Munn & Co.
ATTORNEYS.

UNITED STATES PATENT OFFICE.

WILLIAM HOPPER AND ISAIAH J. ALLEN, OF JEFFERSON, IOWA.

CORN-PLANTER.

SPECIFICATION forming part of Letters Patent No. 294,623, dated March 4, 1884.

Application filed October 5, 1883. (No model.)

*To all whom it may concern:*

Be it known that we, WILLIAM HOPPER and ISAIAH J. ALLEN, of Jefferson, Greene county, Iowa, have invented a new and Improved Corn-Planter, of which the following is a full, clear, and exact description.

Our invention consists of improved mechanism for operating the dropping apparatus, markers or pointers, denters, and driving-guides, whereby it is designed to provide more simple and efficient machines than such as are now in use, all as hereinafter fully described, and specifically set forth in the claims.

Reference is to be had to the accompanying drawings, forming a part of this specification, in which similar letters of reference indicate corresponding parts in all the figures.

Figure 1 is a perspective view of our improved machine. Fig. 2 is a plan view of a part of the same. Fig. 3 is a perspective view of the dropping-slide. Fig. 4 is a section through one of the hoppers and the dropping-slide; and Fig. 5 is a perspective view of one of the denters and part of the apparatus for working the same.

The seed-hoppers $a$ rest on the frame-bars $b$ and $c$ above the hollow furrow-opening runner-stock $d$, through which the seed falls from the hoppers, out of which it is dropped by the slides $e$ through holes $f$, the slides being arranged in the slideways $g$ and operated by the arms $h$ of the rock-shaft $i$. The dropping-slides have an opening, $j$, through which the seed falls, and they are provided with an adjusting-plate, $k$, to regulate the width of the openings for graduating the quantity dropped. The adjusting-plates are secured by screws $l$. The rock-shaft $i$ is mounted on supports $m$, and is connected by an arm, $n$, and rod $o$ with a crank-pin, $p$, on a pinion, $q$, that gears with a master-wheel, $s$, on the axle $t$, which is keyed to the wheel $u$, to be turned by it. The wheel $s$ is fitted loose on the axle $t$, and is held in gear with a clutch, $v$, thereon by the spring $w$. Said wheel is also provided with a lever, $x$, to shift it out of gear when required. The arm $n$ also has a rod, $y$, connected with it, that extends back, and is connected with the crank $z$ of a rock-shaft, $a'$, which carries a denting-crank, $b'$, at each end, to be swung down at the same time that the seed drops, to dent the ground at the places where the seed lies, for guides to check the rows by. The slides $e$ are made to drop the seed at the moment the denters touch the ground by having slots $c'$, in which the slide-shifting arms $h$ work, so as only to shift the slides $e$ by quick short movements just prior to the ends of the movements of the said arms $h$, which swing much farther than the slides $e$ move, the slides resting during the larger portion of the movements of the arms. Besides the denters $b'$, to mark the places where the seed is dropped, we have pointers $d'$, to drop on the dent made by the denter in the last row planted as a test of checking the rows square, said pointers to be used singly, according to which side of the machine the unplanted ground lies. These pointers are formed on the ends of the bent rods $e'$, which are hinged to the respective sides of the machine at $f'$, and have stays $g'$ hinged at $h'$. These pointers $d'$ are suspended by cords $i'$ from levers $j'$, pivoted in the fulcrum-studs $k'$, and they have springs $l'$, that hold the pointers up, except when they are thrust down by rock-shaft $i'$, which has an arm, $m'$, for each lever, and raises it to let the pointer drop at the same time that the dropper-slides are shifted over the holes $f$ and drop the seed. The pointers $d'$ are hinged to the machine in the range of the droppers, and thus check the rows square to the rows checked by the denters $b'$. When the pointer of one side of the machine is not to be used, it is shifted up and secured in the vertical position represented at the rear side of Fig. 1. The pinion $q$ is designed to be one-third of the size of the wheel $s$, for the purpose of making three drops to one revolution of the truck-wheels, and the denters $b'$ are located a distance back of the droppers equal to one-third of the travel of the truck-wheels at each revolution, to dent the ground in the place of the last seed dropped and while the seed is being dropped in the next place ahead. When starting at the side of the field, the dropping-gear is to be set right for the dropping in line with the transverse rows by disconnecting wheel $s$ with lever $x$ and turning it by hand to the right position, and then releasing the lever to allow the wheel to be clutched by the spring. We also employ driving-guides $o'$ to gage the driving of the machine by the last rows planted, said driving-guides $o'$ consisting of bent rods hinged to the sides of the machine at the rear, to be suspended over the last-planted rows by a cord, $p'$, which we connect to both of said guides and arrange through a pulley, $q'$, on the prop $s'$, the cord being of suitable length to suspend one guide in the working position while holding the other up, and so that said cord can be readily shifted to change the guides by running forward and backward through the pulley.

Having thus described our invention, we claim as new and desire to secure by Letters Patent—

1. The combination, with the dropper-slide, of the transverse rock-shaft $i$, mounted on standards $m\ m$ at the forward end of the frame, and provided with downwardly-projecting arms $h\ h$, engaging the dropper-slide, and with an arm, $n$, connected with the gear-wheel $q$ and the transverse rock-shaft $a'$ at the rear end of the frame, to which are attached the denters $b'$ by the rods $o\ y$, whereby the dropper-slide and denters are simultaneously operated, substantially as set forth.

2. The combination, with rock-shaft provided with arms $m'\ m'$ at each end, arms $h\ h$, and arm $n$, of the dropper-slides, operated by the arms $h\ h$, the spring-levers $j$, connected with the pointers $d\ d'$ by rods $i'$, and operated by the arms $m'\ m'$, the denters $b'$ on rock-shaft $a'$, connected to arm $n$ by rod $y$, and a rod, $o$, connecting the gear-wheel $q$ with the arm $n$, whereby motion is imparted to the rock-shaft $i$, and the above-named parts connected therewith, substantially as set forth.

WILLIAM HOPPER.
ISAIAH J. ALLEN.

Witnesses:
S. B. ANDERSON,
ISAAC D. HOWARD.